US012655021B2

(12) United States Patent
Christensen et al.

(10) Patent No.: US 12,655,021 B2
(45) Date of Patent: Jun. 16, 2026

(54) ATR-BASED HYDROGEN PROCESS AND PLANT

(71) Applicant: HALDOR TOPSØE A/S, Kgs. Lyngby (DK)

(72) Inventors: Steffen Spangsberg Christensen, Køge (DK); Arunabh Sahai, Faridabad (IN)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 1015 days.

(21) Appl. No.: 17/767,999

(22) PCT Filed: Sep. 18, 2020

(86) PCT No.: PCT/EP2020/076151
§ 371 (c)(1),
(2) Date: Apr. 11, 2022

(87) PCT Pub. No.: WO2021/073834
PCT Pub. Date: Apr. 22, 2021

(65) Prior Publication Data
US 2024/0059563 A1     Feb. 22, 2024

(30) Foreign Application Priority Data

Oct. 15, 2019     (IN) .............................. 201911041737
Dec. 20, 2019     (DK) ........................... PA 2019 01525

(51) Int. Cl.
*C01B 3/48*          (2006.01)
*C01B 3/382*        (2026.01)

(52) U.S. Cl.
CPC ............... *C01B 3/48* (2013.01); *C01B 3/382* (2013.01); *C01B 2203/0244* (2013.01);
(Continued)

(58) Field of Classification Search
CPC ... C01B 3/48; C01B 3/382; C01B 2203/0244;
C01B 2203/0288; C01B 2203/043;
(Continued)

(56) References Cited

U.S. PATENT DOCUMENTS 4,553,981  A     11/1985  Fuderer
7,985,399  B2     7/2011  Drnevich
(Continued)

FOREIGN PATENT DOCUMENTS

CN          101056817  A     10/2007
CN          101273112  A      9/2008
(Continued)

OTHER PUBLICATIONS

First Office Action with English translation mailed on Sep. 22, 2023, by the China National Intellectual Property Administration for Chinese Application No. 2023092202166400, 24 pages.
(Continued)

*Primary Examiner* — Huy Tram Nguyen
(74) *Attorney, Agent, or Firm* — Boone IP Law

(57) ABSTRACT

A plant and process for producing a hydrogen rich gas are provided, said process comprising the steps of: reforming a hydrocarbon feed in a reforming step using an autothermal reformer (ATR) thereby obtaining a synthesis gas comprising $CH_4$, CO, $CO_2$, $H_2$ and $H_2O$; shifting said synthesis gas in a shift configuration including a high temperature shift step; passing the shifted syngas to a first hydrogen purification unit, e.g. a PSA unit; passing a portion of the off-gas from the first hydrogen purification unit to a second hydrogen purification unit, and using off-gas from the first and second hydrogen purification unit as e.g. fuel for a preheater unit before the ATR.

13 Claims, 1 Drawing Sheet

(52) U.S. Cl.
CPC ................. $C01B$ 2203/0288 (2013.01); $C01B$ 2203/043 (2013.01); $C01B$ 2203/0495 (2013.01); $C01B$ 2203/0827 (2013.01); $C01B$ 2203/1076 (2013.01); $C01B$ 2203/142 (2013.01); $C01B$ 2203/145 (2013.01)

(58) Field of Classification Search
CPC .... C01B 2203/0495; C01B 2203/0827; C01B 2203/1076; C01B 2203/142; C01B 2203/145; C01B 2203/147; C01B 3/40; C01B 2203/1041
USPC ........................................................ 422/628
See application file for complete search history.

(56) References Cited

U.S. PATENT DOCUMENTS

| | | | |
|---|---|---|---|
| 8,124,049 B2 | 2/2012 | Grover | |
| 2010/0047160 A1* | 2/2010 | Allam | ....................... C01B 3/48 422/187 |

| | | | |
|---|---|---|---|
| 2013/0065974 A1 | 3/2013 | Kresnyak | |
| 2013/0243686 A1 | 9/2013 | Genkin et al. | |
| 2019/0382277 A1 | 12/2019 | Speth et al. | |

FOREIGN PATENT DOCUMENTS

| | | | | |
|---|---|---|---|---|
| CN | 101687634 | | 3/2010 | |
| CN | 105209373 | A | 12/2015 | |
| DE | 102011013344 | A1 | 9/2012 | |
| EP | 2674394 | A1 | 12/2013 | |
| WO | 2011148066 | A2 | 12/2011 | |
| WO | WO-2017134162 | A1 * | 8/2017 | ............. C01B 3/382 |

OTHER PUBLICATIONS

Danish Search Report for Danish Application No. PA 201901525 dated Jun. 23, 2020 (9 pages).
International Search Report (PCT/ISA/210) and Written Opinion (PCT/ISA/237) mailed on Dec. 10, 2020, by the European Patent Office as the International Searching Authority for International Application No. PCT/EP2020/076151.

* cited by examiner

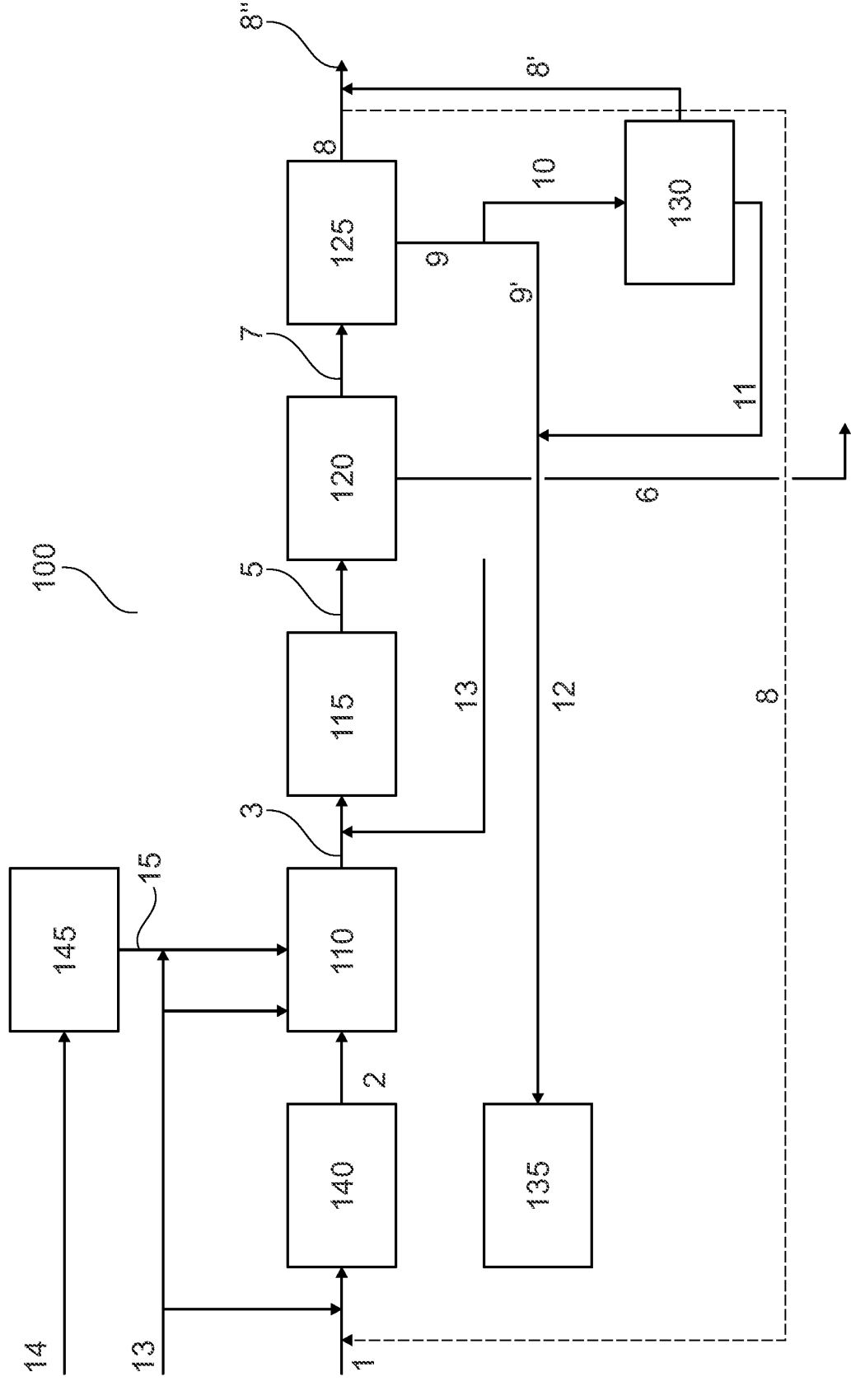

ATR-BASED HYDROGEN PROCESS AND PLANT

FIELD OF THE INVENTION

The present invention relates to a plant and process for producing hydrogen from a hydrocarbon feed, in which the hydrocarbon feed is subjected to reforming for generating a synthesis gas, subjecting the synthesis gas to a shift conversion step for enriching the synthesis gas in hydrogen and then treating the shifted gas in a hydrogen purification unit. In particular, the invention concerns the reforming a hydrocarbon feed in an autothermal reformer (ATR), followed by shift section and hydrogen purification, in which the hydrogen purification includes a first hydrogen purification unit, such as a swing adsorption (PSA) unit, whereby a $H_2$-rich stream is produced as well as a PSA-off-gas stream, and in which at least a portion of the PSA off-gas stream is fed to a second hydrogen purification unit, such as PSA unit. The $H_2$-rich stream produced in the second PSA-unit is optionally mixed with the $H_2$-rich stream produced in the first PSA. The off-gas from the second PSA-unit is optionally mixed with the other portion of the off-gas from the first PSA and used as fuel, for example as fuel for fired heat heaters located upstream the ATR.

BACKGROUND

Following today's demand and competitiveness in hydrogen production, significant efforts have been put into developing optimized production for hydrogen plants, with the objective to improve overall energy efficiency and reduce capital cost. The need for more cost-efficient hydrogen production has spurred the development of technology and catalysts for large-scale hydrogen production units, in order to benefit from economy of scale.

Applicant's (Topsoe's) latest innovations within hydrogen production technology and the development of a new generation of state-of-the-art catalysts ensure highly cost efficient hydrogen production and high plant reliability also for large single line capacities.

EP 2674394 discloses a steam methane reforming (SMR) process for producing a hydrogen product while capturing $CO_2$ from the process. The process requires the use of SMR, followed by shift, water removal and a plurality of at least 3 PSA beds. PSA-tail gas is used as fuel gas in the radiant section of the SMR.

U.S. Pat. No. 7,985,399 discloses a hydrogen production method in which a synthesis gas stream produced by the gasification of a carbonaceous substance. This citation mentions the use of two PSA-units, in which PSA-tail gas (PSA-off gas) from the second PSA-unit is used as fuel in a steam reforming step and in connection with the use of two syngas lines: the first line corresponding to synthesis gas by gasifying carbonaceous feed stock, and the second line using PSA-tail gas from the first line combined with steam and a hydrocarbon feed, which is then reformed by conventional SMR, shifted and passed through a second PSA-unit. The tail gas from this second PSA-unit is used as fuel in the SMR.

U.S. Pat. No. 8,124,049 relates to a high thermal efficiency process for hydrogen recovery requiring the use of a conventional SMR (reforming furnace) and attendant heat recovery system, in which all the tail gas (off-gas) from a first PSA-unit is directed to a separate PSA-unit for $CO_2$-removal.

U.S. Pat. No. 4,553,981 discloses a process for the purification of hydrogen by using two PSA-units, where PSA off-gas is recycled to the reformer used to produce synthesis gas and/or to downstream shift conversion means. This citation is silent about the use of ATR and requires also the use of $CO_2$-removal.

SUMMARY

It is an object of the present invention to improve recovery of hydrogen and reduce consumption of hydrocarbon feed, thereby increasing energy efficiency in a plant and process for producing hydrogen.

It is another object of the present invention to reduce carbon dioxide emissions in a plant and process for producing hydrogen.

These and other objects are solved by the present invention.

Accordingly, in a first aspect, there is provided plant for producing a $H_2$-rich stream from a main hydrocarbon feed, said plant comprising:

a reforming section, said reforming section comprising an autothermal reformer (ATR), said ATR being arranged to receive a hydrocarbon feed and convert it to a stream of syngas;

a shift section, said shift section comprising a high temperature shift (HTS) unit, said high temperature shift unit being arranged to receive a stream of syngas from the ATR and shift it in a high temperature shift step, thereby providing a shifted syngas stream;

a water separation section, said water separation section comprising a separator unit, said water separation section arranged to receive the shifted syngas stream from said shift section and separating water from said shifted syngas stream as a process condensate stream in said separator unit, thereby providing a water-depleted shifted syngas stream;

a first hydrogen purification unit, arranged to receive said water-depleted shifted syngas stream from said separator unit, and separate it into a first high-purity $H_2$ stream and a first off-gas stream;

means for separating said first off-gas stream into a first off-gas fuel stream and a first off-gas feed stream;

a second hydrogen purification unit, arranged to receive said first off-gas feed stream and separate it into a second high-purity $H_2$ stream and a second off-gas fuel stream; and said reforming section further comprises at least one fired heater arranged to pre-heat said main hydrocarbon feed prior to it being fed to said ATR, and said plant is arranged to feed said first off-gas fuel stream and/or said second off-gas fuel stream as fuel for said at least one fired heater.

It would be understood that said means for separating said first off-gas stream into a first off-gas fuel stream and a first off-gas feed stream may be a part of said first hydrogen purification unit. Such means is preferably in the form of a valve.

By the invention, the reforming section comprises an ATR and optionally also a pre-reforming unit, preferably and adiabatic pre-reforming unit, yet there is no steam methane reforming (SMR) unit, i.e. the use of a conventional SMR (also normally referred as radiant furnace, or tubular reformer, or primary reformer) is omitted.

This conveys significant advantages in terms of energy consumption and plant size since it is now possible, among other things, to operate at steam to carbon molar ratios well below 1 and thereby significantly reducing the amount of steam carried in the plant/process. More specifically, the plant enables operation whereby no steam is added between the ATR and the shift section, or between the ATR and any of the shift units in the shift section. This conveys the technical advantage that steam is not carried through the fired heater and the ATR, thus reducing the size of this equipment, duty of the fired heater, and the oxygen consumption thereby also reducing the size of the Air Separation Unit (ASU) used for providing oxygen to the ATR. Further, due to the provision of two hydrogen purification units, as recited above, the combined hydrogen recovery improves to above 95% such as above 99% compared to a situation where only one hydrogen purification unit is used. More specifically, normally 10-15% of the hydrogen treated in a hydrogen purification unit, e.g. a Pressure Swing Adsorption (PSA) unit, ends up in the off-gas of such unit. By the present invention, a part of this off-gas in the form of an off-gas feed stream is treated in a second hydrogen purification unit, thereby recovering extra 85-90% of the hydrogen in the off-gas, and thus giving rise to the above improvement in hydrogen recovery up to 99% as well as reducing the required feed flow (hydrocarbon feed flow) to the reforming section.

It would be understood that by pre-heating said main hydrocarbon feed (see e.g. 1 in accompanying FIGURE), the hydrocarbon feed (see e.g. 2 in accompanying FIGURE) results. The ATR is arranged to receive the hydrocarbon feed and convert it to a stream of syngas. The ATR also receives a stream comprising oxygen, preferably from an Air Separation Unit (ASU).

In an embodiment according to the first aspect of the invention, as mentioned above, the plant is without i.e. is absent of a steam methane reformer unit (SMR) upstream the ATR. In another embodiment according to the first aspect of the invention, the plant is without i.e. is absent of a $CO_2$-removal section downstream said shift section and upstream said water separation section. In other words, the use of a $CO_2$-removal section in between the shift section and water separation section, is avoided. Significant reduction in plant size and costs is thereby achieved.

In another embodiment according to the first aspect of the invention, said plant further comprises a compressor arranged for compressing said first off-gas feed stream prior to it being fed to said second hydrogen purification unit. This enables adapting the pressure to the hydrogen product pressure, i.e. to the pressure of the hydrogen-rich stream (see e.g. 8" in accompanying FIGURE). Before entering the second hydrogen purification unit, the first off-gas feed stream is compressed to 1-2 bar higher pressure than the hydrogen product pressure.

In another embodiment according to the first aspect, the first high-purity $H_2$ stream is mixed with the second high-purity $H_2$ stream to form a hydrogen-rich stream. The latter becomes then the hydrogen product stream.

In another embodiment according to the first aspect of the invention, said first off-gas fuel stream and/or said second off-gas fuel stream are mixed to form a combined off-gas fuel stream prior to being fed as fuel for said at least one fired heater. While it is possible to feed each off-gas fuel stream from either hydrogen purification unit individually to the fired heater, it is more advantageous to first combine both in a single off-gas fuel stream. In the fired heater, the combined off-gas fuel stream is then used as fuel, preferably together with separate fuel gas and combustion air. The combined off-gas fuel stream or a portion of it can also be exported as fuel gas. Said off-gas fuel stream(s), alone or in combination may also be used for other purposes such as for steam superheating.

In another embodiment according to the first aspect of the invention, said reforming section further comprises at least one pre-reforming unit which is arranged upstream the ATR to pre-reform said main hydrocarbon feed and form said hydrocarbon feed prior to it being fed to the ATR. In a particular embodiment, said reforming section further comprises a hydrogenator unit, a sulfur absorption unit arranged upstream said at least one pre-reformer unit, and a hydrogen-recycling compressor for feeding a portion of said first high-purity $H_2$ stream into said main hydrocarbon feed prior to it being fed to the feed side of said at least one pre-reformer unit or prior to it being fed being fed to the feed side of said hydrogenator. Thereby, the energy consumption is further reduced, as hydrogen produced in the process is used in the main hydrocarbon feed prior to it entering the hydrogenator instead of using external hydrogen sources. In other words, the addition of hydrogen to the main hydrocarbon feed further increases the energy efficiency of the plant and process.

Preferably, two or more adiabatic prereformers are arranged in series with interstage preheater(s) i.e. in between prereformer preheater(s).

It would be understood that in these embodiments, the treatment of the main hydrocarbon feed (see e.g. 1 in accompanying FIGURE) prior to the ATR, e.g. in a pre-reforming unit, or in a hydrogenator unit followed by a sulfur absorption unit and a pre-reforming unit, results in said hydrocarbon feed (see e.g. 2 in accompanying FIG. prior to being fed to the ATR.

In another embodiment according to the first aspect of the invention, said first hydrogen purification unit and said second hydrogen purification unit are selected from a pressure swing adsorption (PSA) unit, a hydrogen membrane, a cryogenic separation unit, or combinations thereof, preferably said first and second hydrogen purification unit is a PSA unit.

It would be understood, that additional hydrogen purification units, e.g. a third PSA-unit may be arranged downstream the second hydrogen purification unit to treat off-gas from the second purification unit, thereby producing a third off-gas fuel stream and a third high-purity $H_2$ stream.

In another embodiment according to the first aspect of the invention, the high temperature shift (HTS) unit comprises a promoted zinc-aluminium oxide based high temperature shift (HTS) catalyst, preferably arranged within said HTS unit in the form of one or more catalyst beds, and preferably wherein the promoted zinc-aluminium oxide based HTS catalyst comprises in its active form Zn and Al in a Zn/Al molar ratio in the range 0.5 to 1.0 and a content of alkali metal in the range 0.4 to 8.0 wt %, and a copper content in the range 0-10 wt %, based on the weight of oxidized catalyst.

In a conventional hydrogen plant the standard use of iron based high temperature shift catalyst re-quires a steam/carbon ratio of around 3.0 to avoid iron carbide formation.

$$5Fe_3O_4 + 3CO \leftrightarrow 3Fe_5C_2 + 26CO_2 \tag{1}$$

Formation of iron carbide will weaken the catalyst pellets and may result in catalyst disintegration and pressure drop increase.

Iron carbide will catalyse Fischer-Tropsch by-product formation $$nCO + (n+m/2)H_2 \leftrightarrow C_nH_m + nH_2O \tag{2}$$

5

The Fischer-Tropsch reactions consume hydrogen, whereby the efficiency of the shift section is reduced.

However, according to the present invention a non Fe-catalyst is used, such as a promoted zinc-aluminum oxide based catalyst. For example, the TopsØe SK-501 Flex™ HT shift catalyst which enables operation of the reforming section and high temperature shift section at a steam/carbon ratio down to 0.3.

Thus, the present plant and/or process operating at a steam/carbon ratio down to 0.3 is in contrast to today's traditional hydrogen plants which are based on reforming and/or shift sections operating at a steam/carbon ratio of around 1.5 or higher. In advantageous embodiments of the process the zinc-aluminum oxide based catalyst in its active form comprises a mixture of zinc aluminum spinel and zinc oxide in combination with an alkali metal selected from the group consisting of Na, K, Rb, Cs and mixtures thereof, and optionally in combination with Cu. The catalyst, as recited above, may have a Zn/Al molar ratio in the range 0.5 to 1.0, a content of alkali metal in the range 0.4 to 8.0 wt % and a copper content in the range 0-10% based on the weight of oxidized catalyst.

The high temperature shift catalyst used according to the present process is not limited by strict requirements to steam to carbon ratios, which makes it possible to reduce steam/carbon ratio in the shift section as well as in the reforming section.

Again, significant reduction in the amount of steam carried in the plant and/or process is obtained, thereby reducing plant size and energy consumption. More specifically, a steam/carbon ratio of less than 2.0 has several advantages. Reducing steam/carbon ratio on a general basis leads to reduced feed plus steam flow through the reforming section and the downstream cooling and hydrogen purification sections. Low steam/carbon ratio in the reforming section and shift section enables also higher syngas throughput compared to high steam/carbon ratio. Reduced mass flow through these sections means smaller equipment and piping sizes. The reduced mass flow also results in reduced production of low temperature calories, which can often not be utilised. This means that there is a potential for both lower CapEx (capital expenditure) and OpEx (operating expenses).

As the requirements to the steam/carbon ratio in the high temperature shift step by the present process is significantly reduced compared to known technologies, it is possible by the present invention to reduce steam/carbon ratio through the front-end to e.g. 0.6 or as low as possible dependent on the possible shift solutions, as further explained below. An advantage of a low steam/carbon ratio to the ATR and in the overall process is that smaller equipment is required in the front-end due to the lower total mass flow through the plant.

It would be understood that the term "front-end" means the reforming section. It would also be understood that the reforming section is the section of the plant comprising units up to and including the ATR, i.e. the ATR, or a pre-reformer unit and the ATR, or hydrogenator and sulfur absorber and a pre-reformer unit and ATR.

The plant preferably comprises also an air separation unit (ASU) which is arranged for receiving an air stream and produce an oxygen comprising stream which is then fed through a conduit to the ATR.

The plant preferably comprises also conduits for the addition of steam to the main hydrocarbon feed, to the oxygen comprising stream and to the ATR, and optionally also to the inlet of the reforming section e.g. to the main hydrocarbon feed, and also to the inlet of the shift section in particular to the HTS unit, and/or to additional shift units downstream the HTS unit.

In yet another embodiment according to the first aspect of the invention, the shift section comprises one or more additional high temperature shift units in series, and/or one or more additional shift units downstream the high temperature shift unit, in which said one or more additional shift units are preferably one or more medium temperature shift units and/or one or more low temperature shift units.

The provision of additional shifts units or shifts steps adds flexibility to the plant and/or process when operation at low steam/carbon ratios. The low steam/carbon ratio may result in a lower than optimal shift conversion which means that in some embodiments it may be advantageous to provide one or more additional shift steps. The one or more additional shift steps may include a medium temperature (MT) shift and/or a low temperature (LT) shift and/or a high temperature shift. Generally speaking, the more converted CO in the shift steps the more gained $H_2$ and the smaller front end required.

This is also seen from the exothermic shift reaction: $CO+H_2O \leftrightarrow CO_2+H_2+heat$ As recited above, steam may optionally be added before and after the high temperature shift step such as before one or more following MT or LT shift and/or HT shift steps in order to maximize performance of said following HT, MT and/or LT shift steps.

Having two or more high temperature shift steps in series (such as a high temperature shift step comprising two or more shift reactors in series e.g. with the possibility for cooling and/or steam addition in between) may be advantageous as it may provide increased shift conversion at high temperature which gives a possible reduction in required shift catalyst volume and therefore a possible reduction in CapEx. Furthermore, high temperature reduces the formation of methanol, a typical shift step byproduct.

Since undesired methanol may still be formed, in yet another embodiment according to the first aspect, the plant further comprises a methanol removal section arranged between the shift section and the water separation section, said methanol section being arranged to separate a methanol-rich stream from said shifted syngas stream. Preferably, a water wash is provided in said shifted syngas stream to reduce the amount of methanol.

Preferably the MT and LT shift steps may be carried out over promoted copper/zinc/alumina catalysts. For example, the low temperature shift catalyst type may be LK-821-2, which is characterized by high activity, high strength, and high tolerance towards sulphur poisoning. A top layer of a special catalyst may be installed to catch possible chlorine in the gas and to prevent liquid droplets from reaching the shift catalyst.

The MT shift step may be carried out at temperatures at 190-360° C.

The LT shift step may be carried out at temperatures at $T_{dew}+15-290°$ C., such as, 200-280° C. For example, the low temperature shift inlet temperature is from $T_{dew}+15-250°$ C., such as 190-210° C.

Reducing the steam/carbon ratio leads to reduced dew point of the process gas, which means that the inlet temperature to the MT and/or LT shift steps can be lowered. A lower inlet temperature can mean lower CO slippage outlet the shift reactors, which is also advantageous for the plant and/or process.

In a second aspect of the invention, there is also provided a process for producing a $H_2$-rich stream from a main hydrocarbon feed, said process comprising the steps of:

supplying a hydrocarbon feed to the ATR and converting it to a stream of syngas;

supplying a stream of syngas from the ATR to the shift section, and shifting it in a high temperature shift step, thereby providing a shifted gas stream;

supplying the shifted gas stream from the shift section to a water separation section, and separating water from said shifted syngas stream as a process condensate stream in a separator unit, thereby providing a water-depleted shifted syngas stream;

supplying said water-depleted syngas stream to a first hydrogen purification unit, and separating it into a first high-purity $H_2$ stream and a first off-gas stream;

separating said first off-gas stream into a first off-gas fuel stream and a first off-gas feed stream;

feeding said first off-gas feed stream into a second hydrogen purification unit and separating it into a second high-purity $H_2$ stream and a second off-gas fuel stream; and pre-heating said main hydrocarbon feed prior to being fed to said ATR in at least one fired heater, and feeding said first off-gas fuel stream and/or said second off-gas fuel stream as fuel for said at least one fired heater A fired heater is used for preheating the main hydrocarbon (natural gas) feed, main hydrocarbon feed to prereforming unit e.g. after being passed through a hydrogenator and sulfur absorber, the hydrocarbon feed to the ATR and for steam generation and steam superheating. The necessary heat is thus generated by burning a mixture of natural gas, fuel gas and off-gas from the hydrogen purification units, e.g. PSA-units.

In another embodiment according to the second aspect of the invention, the process further comprises pre-reforming said main hydrocarbon feed in at least one pre-reforming unit to form a hydrocarbon feed prior to it being fed to the ATR, and mixing a portion of said first high-purity $H_2$ stream with main hydrocarbon feed before being fed to the feed side of said at least one pre-reforming unit.

Preferably one or more prereforming units are provided as part of the reforming section and upstream the ATR. In the prereforming unit(s) all higher hydrocarbons can be converted to carbon oxides and methane, but the prereforming unit(s) are also advantageous for light hydrocarbons. Providing the prereforming unit(s), hence prereforming step(s), may have several advantages including reducing the required $O_2$ consumption in the ATR and allowing higher inlet temperatures to the ATR since cracking risk by pre-heating is minimized. Furthermore, the prereforming unit(s) may provide an efficient sulphur guard resulting in a practically sulphur free feed gas entering the ATR and the downstream system. The prereforming step(s) may be carried out at temperatures between 300-650° C., preferably 390-480° C.

In yet another embodiment according to the second aspect of the invention, the steam to carbon ratio of the synthesis gas supplied from the ATR to the shift section is less than 2.0, preferably 0.3-1.0.

As recited above in connection with the first aspect of the invention, the present plant and/or process operates at steam/carbon rations down to 0.3. Low steam/carbon ratio in the reforming section and the shift section (i.e. optionally including any steam added to the shift section) enables higher syngas throughput compared to high steam/carbon ratio.

The carbon feed for the ATR is mixed with oxygen and additional steam in the ATR, and a combination of at least two types of reactions take place. These two reactions are combustion and steam reforming.

Combustion Zone:

$$2H_2+O_2 \leftrightarrow 2H_2O+heat \tag{3}$$

$$CH_4+3/2O_2 \leftrightarrow CO+2H_2O+heat \tag{4}$$

Thermal and Catalytic Zone:

$$CH_4+H_2O+heat \leftrightarrow CO+3H_2 \tag{5}$$

$$CO+H_2O \leftrightarrow CO_2+H_2+heat \tag{6}$$

The combustion of methane to carbon monoxide and water (reaction (4)) is a highly exothermic process. Excess methane may be present at the combustion zone exit after all oxygen has been converted.

The thermal zone is part of the combustion chamber where further conversion of the hydrocarbons proceeds by homogenous gas phase reactions, mostly reactions (5) and (6). The endothermic steam reforming of methane (5) consumes a large part of the heat developed in the combustion zone.

Following the combustion chamber there may be a fixed catalyst bed, the catalytic zone, in which the final hydrocarbon conversion takes place through heterogeneous catalytic reactions. At the exit of the catalytic zone, the synthesis gas preferably is close to equilibrium with respect to reactions (5) and (6).

The steam/carbon ratio in the reforming section may be 2.6-0.1, 2.4-0.1, 2-0.2, 1.5-0.3, 1.4-0.4, such as 1.2, 1.0 or 0.6. The steam/carbon ratio is defined as the ratio of all steam added to the reforming section upstream the shift section, e.g. the high temperature shift section, i.e. steam which may have been added to the reforming section via the feed gas, oxygen feed, by addition to the ATR and the hydrocarbons in the feed gas (main hydrocarbon feed 1 and/or hydrocarbon feed 2) to the reforming section on molar basis. Hence, in yet another embodiment according to the second aspect of the invention, the steam to carbon ratio defined as the molar ratio of all steam added upstream the shift section to the carbon of main hydrocarbon feed or hydrocarbon feed, is 2.6-0.1, 2.4-0.1, 2-0.2, 1.5-0.3 or 1.4-0.4, such as 1.2 or 1 or, 0.6. The steam added upstream the shift section does not include any steam added to the synthesis gas supplied from the ATR. In other words, it includes only the steam added to the ATR and upstream the ATR.

Thus, according to the present invention it is possible to run the plant and/or process with no additional steam addition between the reforming step(s) and the high temperature shift step.

In yet another embodiment according to the second aspect of the invention, the process further comprises adding steam to any of: main hydrocarbon feed, hydrocarbon feed, an oxygen stream fed to the ATR, ATR, HTS unit, additional shift units downstream the HTS unit, or combinations thereof.

In advantageous embodiments the space velocity in the ATR is low, such as less than 20000 $Nm^3$ $C/m^3/h$, preferably less than 12000 $Nm^3$ $C/m^3/h$ and most preferably less 7000 $Nm^3$ $C/m^3/h$. The space velocity is defined as the volumetric carbon flow per catalyst volume and is thus independent of the conversion in the catalyst zone.

In preferred embodiments the temperature in the high temperature shift step is in the range 300-600° C., such as 360-470° C. This means that according to the present process it is possible to run a high temperature shift reaction on a feed with much lower steam/carbon ratio than possible by known processes. For example, the high temperature shift inlet temperature may be 300-400° C., such as 350-380° C.

Any of the embodiments of the first aspect may be used in connection with any of the embodiments of the second aspect, or vice versa.

BRIEF DESCRIPTION OF THE FIGURE

The sole FIGURE illustrates a layout of the ATR-based hydrogen plant and process according to an embodiment of the invention including two hydrogen purification units (PSA-units).

DETAILED DESCRIPTION OF THE FIGURE

The FIGURE shows a plant 100 according to an embodiment of the invention in which a main hydrocarbon feed 1, such as natural gas, is passed to a reforming section comprising a pre-reforming unit 140 and autothermal reformer (ATR) 110. The reforming section may also include a hydrogenator and sulfur absorber unit (not shown) upstream the prereforming unit 140. The main hydrocarbon steam is mixed with steam 13 and optionally also with a hydrogen-rich stream 8 from a first hydrogen purification unit 125 located downstream. The resulting hydrocarbon feed 2 is fed to the ATR 110, as so is oxygen 15 and steam 13. The oxygen stream 15 is produced by means of an air separation unit (ASU) 145, to which air 14 is fed. In the ATR 110, the hydrocarbon feed 2 is converted to a stream of syngas 3, which is then passed to a shift section. The hydrocarbon feed 2 enters the ATR at 650° C. and the temperature of the oxygen is around 253° C. The steam/carbon ratio of the synthesis gas 3 from the reforming section is S/C=0.6. This syngas, i.e. process gas 3 leaves the reforming section at about 1050° C. through a refractory lined outlet section and transfer line to the waste heat boilers in the process gas cooling section.

The shift section comprises a high temperature shift (HTS) unit 115 where steam 13 also may be added upstream. Additional shift units, such as medium and low temperature shift units (not shown) may also be included in the shift section. By way of example, in a shift section including high and medium/low temperature shift, the high temperature shift operates under the following conditions: HT shift: Tin/Tout: 330/465° C. (ΔT=135° C.); LT shift: Tin/Tout: 195/250° C. (ΔT=55° C.). After reforming, about 28.3 vol % CO is present in the syngas 3 (dry basis). In the high temperature shift converter, the CO content is reduced to approximately 7.6 vol %, and the temperature increases from 330° C. to 465° C. The heat content of the effluent from the high temperature CO converter is recovered in a waste heat boiler and in a boiler feed water preheater. The process gas from the high shift converter is thereby cooled to 195° C. and passed on to the medium/low temperature shift converter in which the CO content is reduced to approximately 1.0 vol %, while the temperature increases to 250° C.

From the shift section, a shifted gas stream 5 is thus produced, which is then cooled and fed to a water separation section comprising a separator unit 120 e.g. a process condensate separator, thereby providing a water-depleted shifted syngas stream 7 and a process condensate stream 6. The syngas stream 7 is then fed to a first hydrogen purification unit 125, e.g. a first PSA-unit, from which a first high purity H₂ stream 8 and a first off-gas stream 9 are produced. This first off-gas stream 9 is divided in a first off-gas fuel stream 9' and a first off-gas feed stream 10. The latter is fed to a second hydrogen purification unit 130, e.g. a second PSA-unit, which produces a second high-purity H₂ stream 8' and a second off-gas fuel stream 11. The first and second off-gas fuel streams 9' and 11 are combined into a common off-gas fuel stream 12, which serves as fuel for a fired heater 135 and optionally also as fuel for steam superheaters. The fired heater 135 provides for the indirect heating of main hydrocarbon feed 1 and hydrocarbon feed 2. The first and second high-purity hydrogen streams 8, 8' are combined into a final hydrogen-rich stream 8", e.g. the H₂ product stream. By the invention it is now possible to improve recovery of hydrogen and at the same time reduce the consumption of hydrocarbon feed, e.g. natural gas.

The invention claimed is:

1. A plant for producing a H₂-rich stream from a main hydrocarbon feed, said plant comprising:

a reforming section, said reforming section comprising an autothermal reformer (ATR), said ATR being arranged to receive a hydrocarbon feed and convert it to a stream of syngas;

a shift section, said shift section comprising a high temperature shift (HTS) unit, said high temperature shift unit being arranged to receive a stream of syngas from the ATR and shift it in a high temperature shift step, thereby providing a shifted syngas stream;

a water separation section, said water separation section comprising a separator unit, said water separation section arranged to receive the shifted syngas stream from said shift section and separating water from said shifted syngas stream as a process condensate stream in said separator unit, thereby providing a water-depleted shifted syngas stream;

a first hydrogen purification unit, arranged to receive said water-depleted shifted syngas stream from said separator unit, and separate it into a first high-purity H₂ stream and a first off-gas stream;

means for separating said first off-gas stream into a first off-gas fuel stream and a first off-gas feed stream;

a second hydrogen purification unit, arranged to receive said first off-gas feed stream and separate it into a second high-purity H₂ stream and a second off-gas fuel stream; and said reforming section further comprises at least one fired heater arranged to pre-heat said main hydrocarbon feed prior to it being fed to said ATR, and said plant is arranged to feed said first off-gas fuel stream and/or said second off-gas fuel stream as fuel for said at least one fired heater, wherein said plant further comprises a compressor arranged for compressing said first off-gas feed stream prior to it being fed to said second hydrogen purification unit, wherein said reforming section further comprises at least one pre-reforming unit which is arranged upstream the ATR to pre-reform said main hydrocarbon feed and form said hydrocarbon feed prior to it being fed to the ATR, wherein said reforming section further comprises a hydrogenator unit, a sulfur absorption unit arranged upstream said at least one pre-reformer unit, and a hydrogen-recycling compressor for feeding a portion of said first high-purity $H_2$ stream into said main hydrocarbon feed prior to it being fed to the feed side of said at least one pre-reformer unit or prior to it being fed to the feed side of said hydrogenator, wherein said plant is without a CO2-removal section downstream said shift section and upstream said water separation section.

2. The plant according to claim 1, wherein said plant is without a steam methane reformer unit (SMR) upstream the ATR.

3. The plant according to claim 1, wherein the first high-purity $H_2$ stream is mixed with the second high-purity $H_2$ stream to form a hydrogen-rich stream.

4. The plant according to claim 2, wherein said first off-gas fuel stream and/or said second off-gas fuel stream are mixed to form a combined off-gas fuel stream prior to being fed as fuel for said at least one fired heater.

5. The plant according to claim 1, wherein said first hydrogen purification unit and said second hydrogen purification unit are selected from a pressure swing adsorption (PSA) unit, a hydrogen membrane, a cryogenic separation unit, or combinations thereof.

6. The plant according to claim 1, wherein the high temperature shift (HTS) unit comprises a promoted zinc-aluminium oxide based high temperature shift (HTS) catalyst.

7. The plant according to claim 1, wherein the shift section comprises one or more additional high temperature shift units in series, and/or one or more additional shift units downstream the high temperature shift unit.

8. The plant according to claim 1, wherein the shift section is the only shift section on the stream of syngas.

9. The plant according to claim 1, wherein there is no shift section on any of:

the first off-gas stream, the first off-gas fuel stream, the first off-gas feed stream and the second off-gas fuel stream.

10. A process for producing a $H_2$-rich stream from a main hydrocarbon feed, said process comprising the steps of:

providing a plant according to claim 1;

supplying a hydrocarbon feed to the ATR and converting it to a stream of syngas;

supplying a stream of syngas from the ATR to the shift section, and shifting it in a high temperature shift step, thereby providing a shifted gas stream;

supplying the shifted gas stream from the shift section to a water separation section, and separating water from said shifted syngas stream as a process condensate stream in a separator unit, thereby providing a water-depleted shifted syngas stream;

supplying said water-depleted syngas stream to a first hydrogen purification unit, and separating it into a first high-purity $H_2$ stream and a first off-gas stream, separating said first off-gas stream into a first off-gas fuel stream and a first off-gas feed stream;

feeding said first off-gas feed stream into a second hydrogen purification unit and separating it into a second high-purity H2 stream and a second off-gas fuel stream; and pre-heating said main hydrocarbon feed prior to being fed to said ATR in at least one fired heater, and feeding said first off-gas fuel stream and/or said second off-gas fuel stream as fuel for said at least one fired heater, wherein the process further comprises pre-reforming said main hydrocarbon feed in at least one pre-reforming unit to form a hydrocarbon feed prior to it being fed to the ATR, and mixing a portion of said first high-purity $H_2$ stream with main hydrocarbon feed before being fed to the feed side of said at least one pre-reforming unit, and wherein the process further comprises compressing said first off-gas feed stream prior to it being fed to said second hydrogen purification unit.

11. The process according to claim 10, wherein the steam to carbon ratio of the synthesis gas supplied from the ATR to the shift section is less than 2.0.

12. The process according to claim 10, wherein the steam to carbon ratio defined as the molar ratio of all steam added upstream the shift section to the carbon of main hydrocarbon feed and/or hydrocarbon feed, is 2.6-0.1.

13. The process according to claim 10, wherein the process further comprises adding steam to any of: main hydrocarbon feed, hydrocarbon feed, an oxygen stream fed to the ATR, ATR, HTS unit, additional shift units downstream the HTS unit, or combinations thereof.

* * * * *